(12) United States Patent
Karan

(10) Patent No.: US 10,943,512 B2
(45) Date of Patent: *Mar. 9, 2021

(54) METHOD OF UTILIZING A TAMPER EVIDENT TAG

(71) Applicant: Aharon A. Karan, Glendale, WI (US)

(72) Inventor: Aharon A. Karan, Glendale, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,025

(22) Filed: Nov. 27, 2019

(65) Prior Publication Data

US 2020/0098288 A1    Mar. 26, 2020

Related U.S. Application Data

(63) Continuation of application No. 16/295,238, filed on Mar. 7, 2019, and a continuation of application No. 16/285,921, filed on Feb. 26, 2019, now Pat. No. 10,565,901, said application No. 16/295,238 is a continuation of application No. 15/336,331, filed on Oct. 27, 2016, now Pat. No. 10,255,830, said
(Continued)

(51) Int. Cl.
| | |
|---|---|
| *G06K 19/02* | (2006.01) |
| *G09F 3/03* | (2006.01) |
| *G09F 3/14* | (2006.01) |
| *G06K 19/06* | (2006.01) |
| *G09F 3/00* | (2006.01) |
| *G06K 19/077* | (2006.01) |
| *G09F 3/02* | (2006.01) |

(52) U.S. Cl.
CPC ......... *G09F 3/03* (2013.01); *G06K 19/06028* (2013.01); *G06K 19/07722* (2013.01); *G06K 19/07749* (2013.01); *G06K 19/07758* (2013.01); *G06K 19/07762* (2013.01); *G09F 3/0292* (2013.01); *G09F 3/0297* (2013.01); *G09F 3/0341* (2013.01); *G09F 3/14* (2013.01); *G09F 2003/023* (2013.01); *G09F 2003/0257* (2013.01); *G09F 2003/0282* (2013.01)

(58) Field of Classification Search
CPC .............................. B42D 1/006; B42D 1/008
USPC ................................................. 235/488, 487
See application file for complete search history.

(56) References Cited

U.S. PATENT DOCUMENTS

| | | | |
|---|---|---|---|
| 5,373,656 A | 12/1994 | Merser | |
| 5,560,657 A * | 10/1996 | Morgan | ................ G09F 3/0292 283/80 |

(Continued)

*Primary Examiner* — Daniel St Cyr

(74) *Attorney, Agent, or Firm* — Boyle Fredrickson, S.C.

(57) ABSTRACT

A method of associating a tamper evident tag with an article is provided. The method includes the steps of providing the tamper evident tag with first and second layers laminated to each other and inserting a fastener through the article at a user selected location thereof. A terminal end of the fastener is positioned on a second layer of the tamper evident tag and a first portion of the second layer is removed to expose an adhesive on a first portion of the first layer. The first portion of the first layer of the tamper evident tag is folded over a second portion of the first layer so as to capture a second portion of the inner layer between the first and second portions of the first layer and to capture the terminal end of the fastener between the first portion of the first layer and the second portion of the second layer of the tamper evident tag thereby retaining the article on the fastener.

22 Claims, 8 Drawing Sheets

Related U.S. Application Data application No. 16/285,921 is a continuation of application No. 15/336,331, filed on Oct. 27, 2016, now Pat. No. 10,255,830.

(60) Provisional application No. 62/344,030, filed on Jun. 1, 2016, provisional application No. 62/248,584, filed on Oct. 30, 2015.

(56) References Cited

U.S. PATENT DOCUMENTS

| | | |
|---|---|---|
| 5,799,425 A | 9/1998 | Merser et al. |
| 5,826,775 A | 10/1998 | Mooney et al. |
| 6,694,653 B2 * | 2/2004 | Bradfield ............ G08B 13/2434 40/642.01 |
| 8,381,991 B2 * | 2/2013 | Atherton ............ G06K 7/10178 235/375 |
| 2001/0022280 A1 | 9/2001 | Kannabiran et al. |
| 2005/0178037 A1 | 8/2005 | Kunreuther |
| 2008/0048030 A1 | 2/2008 | Garner |
| 2009/0121010 A1 | 5/2009 | Ireland et al. |
| 2011/0031148 A1 | 2/2011 | Rosendall et al. |

\* cited by examiner

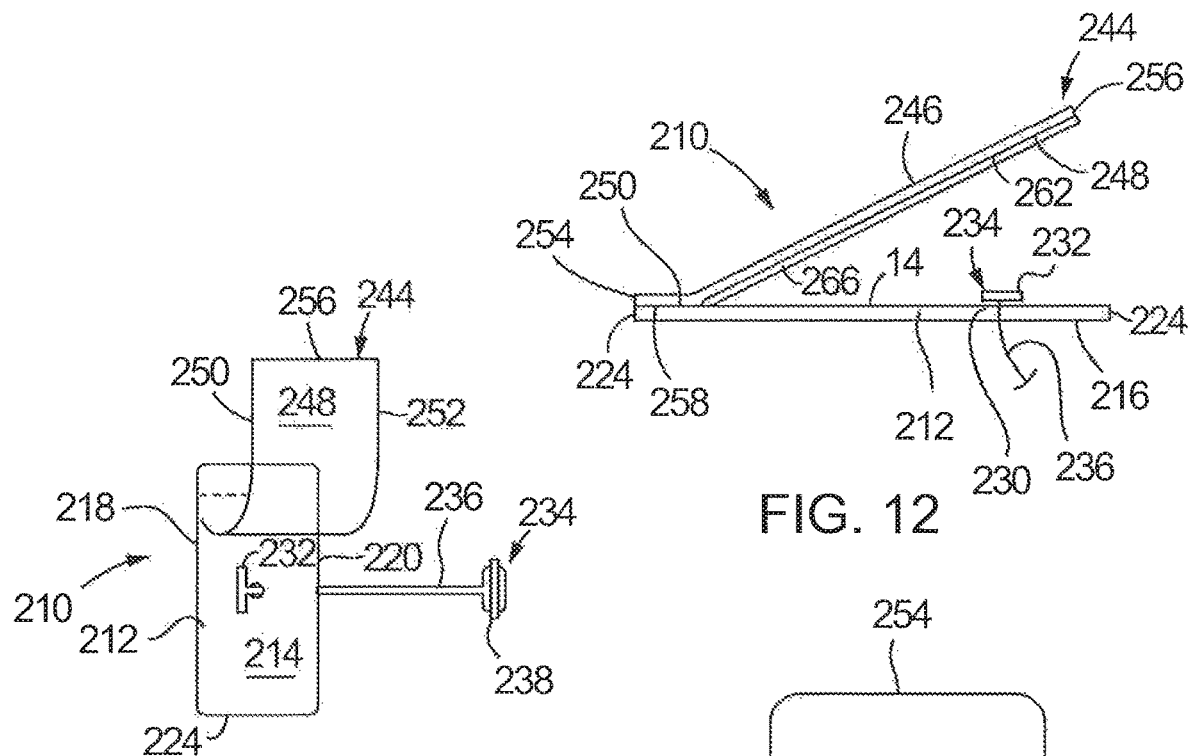
FIG. 12
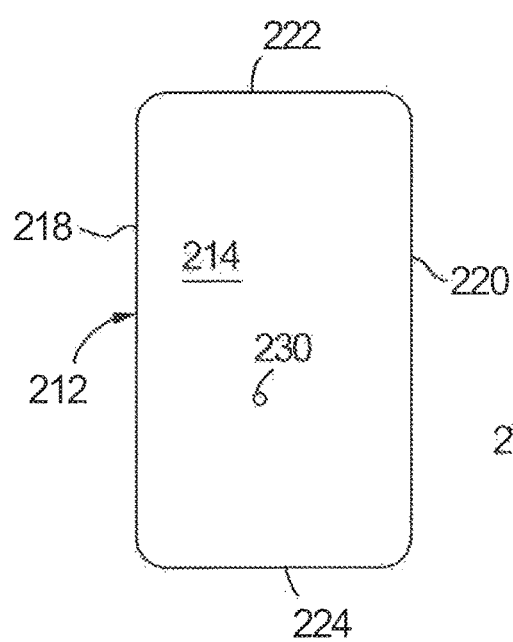
FIG. 11
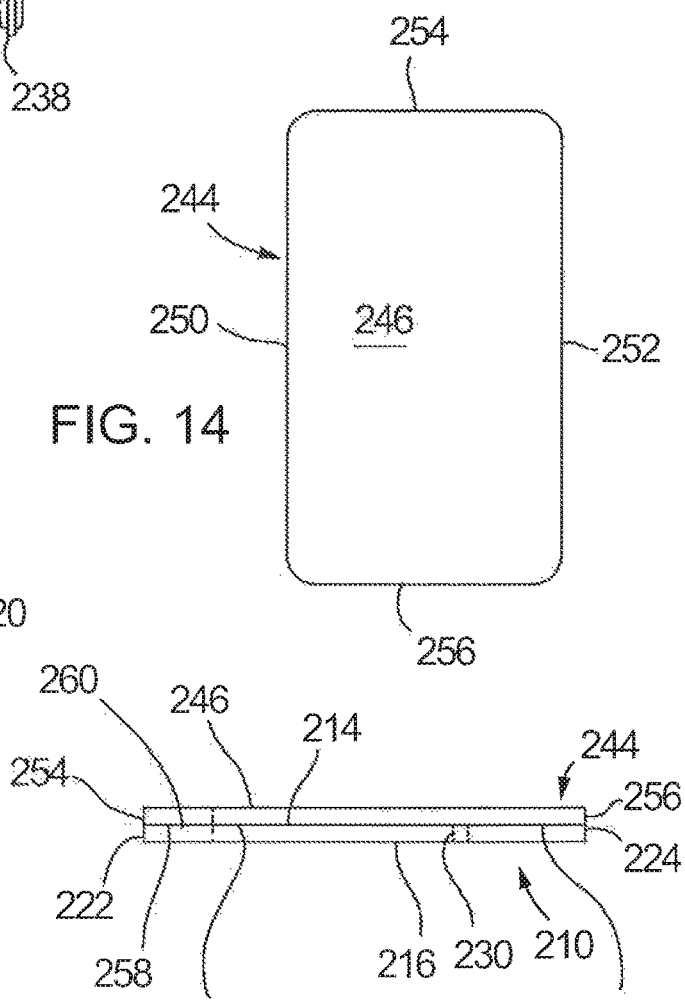
FIG. 14
FIG. 13
FIG. 15

METHOD OF UTILIZING A TAMPER EVIDENT TAG

CROSS-REFERENCE TO RELATED APPLICATIONS

This application is a continuation of U.S. application Ser. No. 16/285,921, filed Feb. 26, 2019, and of U.S. application Ser. No. 16/295,238, filed Mar. 7, 2019, which are continuations of U.S. application Ser. No. 15/336,331 filed Oct. 27, 2016, now issued U.S. Pat. No. 10,255,830, issued Apr. 9, 2019, which claims priority from U.S. Provisional Patent Application Ser. No. 62/248,584, filed on Oct. 30, 2015, the entirety of which is hereby expressly incorporated by reference herein, and from U.S. Provisional Patent Application Ser. No. 62/344,030, filed on Jun. 1, 2016, the entirety of which is hereby expressly incorporated by reference herein.

FIELD OF THE INVENTION

This invention relates generally to the prevention of retail theft, and in particular, to a method of associating a tamper evident tag with an article so as to prevent the theft or fraudulent return of the article.

BACKGROUND AND SUMMARY OF THE INVENTION

Refund theft, also known as refund fraud, refund scam or whitehouse scam, has increased dramatically over the past decade. The crime typically involves the returning of goods which are ineligible for refund to a retailer in exchange for money or other goods. Retailers estimate that over five percent of holiday returns are fraudulent. As such, cracking down on refund theft has become a high priority among retailers in general, and in particular, among those retailers that sell high end and designer clothing.

Refund theft takes many forms and includes everything from returning used goods to switching tags on sale merchandise to altering e-receipts from online purchases. By way of example, over the past few years, there has been a substantial increase in the wearing and subsequent return of expensive clothes. This practice, referred to as wardrobing by merchants, costs retailers billions of dollars every year and results in higher prices on all goods. In a recent survey of the National Retail Foundation, approximately 65 percent of retailers said shoppers had returned used products.

Retailers have taken various approaches to combatting wardrobing. For example, Bloomingdale's has begun attaching a specially made plastic tag to dresses costing more than $150. The tag is left on the dress after the sale. These special tags, called "b-tags," are attached to visible places of the dress, such as the front bottom hemline, thereby making them difficult to hide when the dress item is worn. Once the plastic tag is removed, the garment cannot be returned. While functional for its intended purpose, it can be appreciated that affixing a b-tag to a garment adds to the overall cost of such garment to the retailer which, in turn, adds to the overall cost of the garment to the consumer. As such, while adding the cost of the b-tag may be of minimal consequence to more expensive items, affixing the b-tag to less expensive items may be cost prohibitive.

In view of the foregoing, it can be appreciated there exists an unresolved need for a device which prevents the fraudulent return of retail goods and/or refunds therefore and a method of using the same.

In accordance with the present invention, a method is provided of forming a tamper evident tag connectable to an article by a tag fastener. The method includes the step of inserting a first end of tag fastener through the article and first and second layers of the tamper evident tag. The first layer is larger than the second layer. The first layer of the tamper evident tag is folded onto itself so as to capture the second layer of the tamper evident tag and first end of the tag fastener therebetween.

Security information may be printed on a first side of the second layer of the tamper evident tag. The first layer includes first and second portions having adhesive thereon. The second layer also includes first and second portions. The first portion of the second layer is bound to the first portion of the first layer by the adhesive and the second portion of the second layer is removeably affixed to the second portion of the first layer. The second portion of the second layer may be removed from the second portion of the first layer to expose the adhesive on the second portion of the first layer. Thereafter, the first portion of the second layer is contacted with the adhesive on the second portion of the first layer to affix the second portion of the first layer to the second layer. The second portion of the second layer is provided with a non-binding layer of material affixed thereto, such as silicone or wax. The second layer may include a printable surface and the method may include the additional step of printing at least one of a barcode and an alphanumeric code on the second layer. The first layer may transparent.

In accordance with a further aspect of the present invention, a method is provided of preventing the fraudulent return of an article by a seller. The method includes the step of inserting a first end of a tag fastener through the article and through an aperture formed in a tag having an inner and an outer layer. A unique code is provided on the tag. A portion of the inner layer of the tag is removed to expose an adhesive. The exposed adhesive is brought into contact with the inner layer of the tag to capture the first end of the tag fastener between the outer layer and the inner layer. The unique code is associated with the article for future reference.

It is contemplated for information on the unique code be embedded in a receipt provided to a customer after purchase of the article. As such, the return of the article to the seller is prevented if the information on the unique code embedded in a receipt fails to match the unique code of the tamper evident tag. The unique code includes at least one of a barcode and an alphanumeric code. The outer layer may be transparent and the first portion of the backing layer may be coated with a releasable, non-binding agent, e.g., silicone. A second portion of the backing layer is free of the releasable, non-binding agent.

In accordance with a further aspect of the present invention, a tamper evident tag is connectable to an article by a tag fastener having first and second end. The tamper evident tag includes a first layer having an outer surface, an inner surface including first and second portions, and an aperture extending through the first layer and communicating with the first portion of the inner surface. An adhesive is disposed on the first and second portions of the inner surface of the first layer. A second layer has first and second portions, an inner surface, an outer surface and an aperture extending through the first portion of the second layer. The inner surface of the first portion of the second layer is bound to the inner surface of the first portion of the inner surface of the first layer by the adhesive and the second portion of the second layer is removeably affixed to the second portion of the inner surface of the first layer. The aperture through the first layer communications with the aperture through the second layer such that the first end of tag fastener is insertable through first and second layers of the tamper evident tag. The first layer is foldable onto itself such that the second portion of the inner surface of the first layer is configured to be bound to outer surface of the first portion the second layer so as to capture the first end of the tag fastener therebetween.

Security information may be printed on the outer surface of the second layer of the tamper evident tag. A non-binding layer of material may be affixed to the inner surface of the second portion of the second layer, wherein the material is one of silicone and wax. At least one of a barcode and an alphanumeric code is printed on at least one of the inner surface and the outer surface of the first portion of the second layer. The first layer may be transparent.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 11 is a top plan view of an alternate embodiment of a tamper evident tag in accordance with the present invention in an initial configuration;

FIG. 12 is a side elevational view of the tamper evident tag of FIG. 11;

FIG. 13 is a top plan view of base layer of the tamper evident tag of FIG. 11;

FIG. 14 is a top plan view of the transparent layer of the tamper evident tag of FIG. 11;

FIG. 15 is a side elevational view of the tamper evident tag of FIG. 11 in affixed configuration, without a captured tag fastener;

DETAILED DESCRIPTION OF THE DRAWINGS

Figure 1:
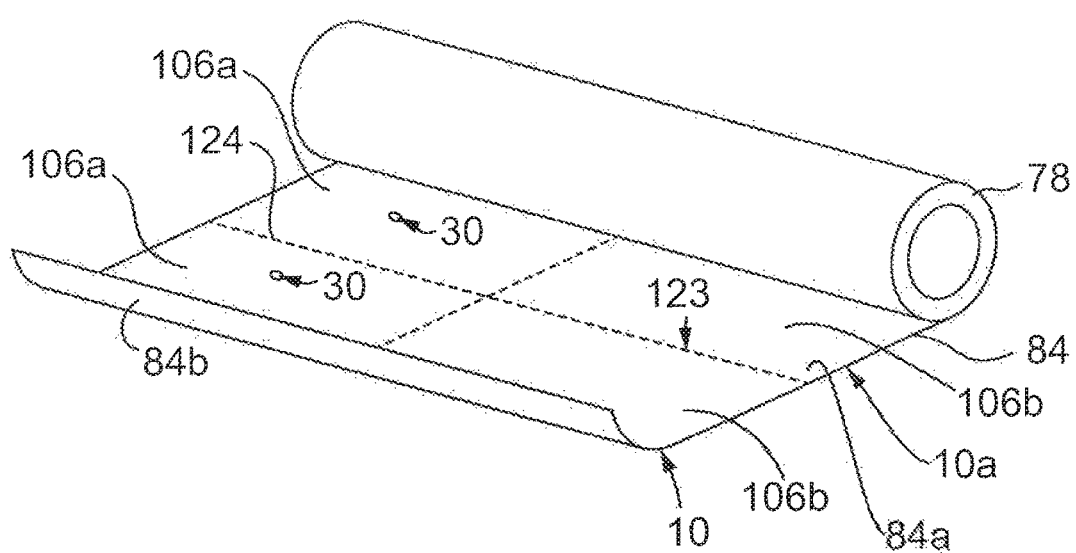
FIG. 1 is an isometric view of a roll of tamper evident tags in accordance with the present invention.
Figure 3:
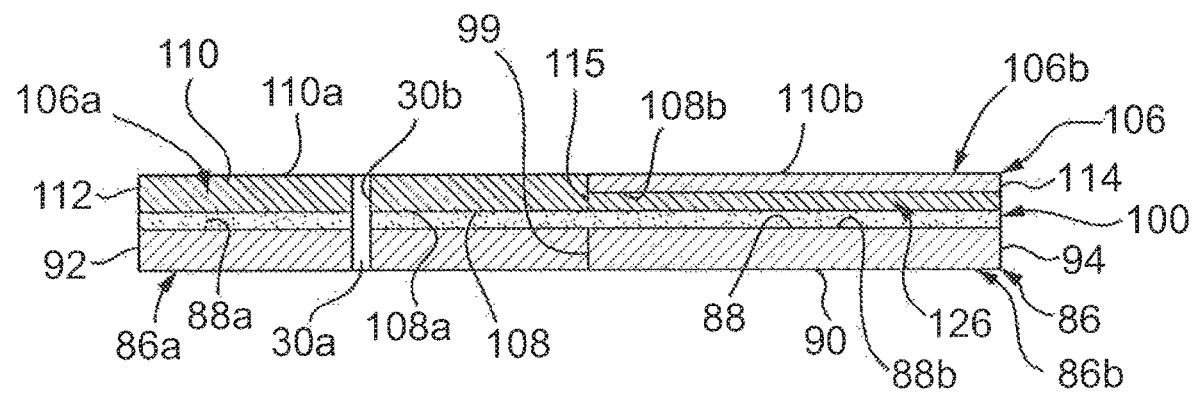
FIG. 3 is a cross-sectional view of the tamper evident tag of the present invention taken along line 3-3 of FIG. 2B.
Figure 10:
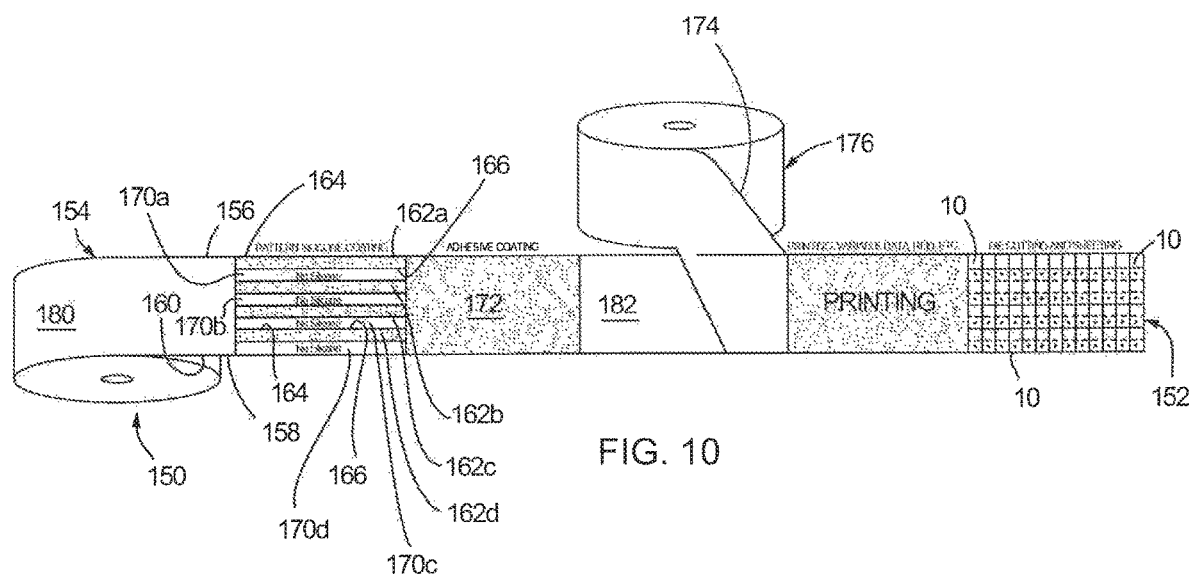
FIG. 10 is a schematic view of a view show a method of fabricating a plurality of tamper evident tags in accordance with the present invention.

Referring to FIG. 1, a tamper evident tag for preventing the fraudulent return of retail goods and/or refunds is generally designated by the reference numeral 10. As hereinafter described, it is intended to interconnect tag 10 to an article to be sold by a converter/merchant/seller/retailer. Initially, it is noted tag 10 may be fabricated as one of plurality of tags interconnected to form an elongated sheet 84 of tag material, hereinafter described, wherein adjacent tags, e.g., tags 10 and 10a in FIG. 10, are interconnected along line 123. Perforations 124 may be arranged along line 123 between first and second sides 84a and 84b, respectively, of sheet 84 along the entire width thereof to assist in the separation of individual tags 10 from sheet 84 of tag material. As best seen in FIG. 1, sheet 84 of tag material may be stored on a roll 78 formed by winding the sheet 84 around a tube or by turning sheet 84 over on itself. Alternatively, it can be appreciated that tags 10 may be provided to a user individually or on rectangular sheets separable into individual tags 10.

Referring to FIGS. 2A-2C and 3, tag 10 is formed from tag material constructed of a plurality of layers. More specifically, tag 10 includes a first transparent layer 86 formed from a generally clear or transparent material. Transparent layer 86 is defined by first and second spaced edges 92, and 94, respectively, and first and second spaced ends 96 and 98, respectively. A score line 99 is transverse to first and second edges 92 and 94, respectively, at location generally equidistant from first and second ends 96 and 98, respectively. Score line 99 is generally parallel to first and second ends 96 and 98, respectively, and divides transparent layer 86 into first and second portions 86a and 86b, respectively. In the depicted embodiment, transparent layer 86 has a generally rectangular configuration. However, other configurations are possible without deviating from the scope of the present invention, Transparent layer 86 further includes an inner surface 88 and an outer surface 90. It is contemplated for first portion 88a of inner surface 88 associated with first portion 86a of transparent layer 86 to have a surface area approximately equal to the surface area of second portion 88b of inner surface 88 associated with second portion 86h of transparent layer 86. An aperture 30a extends through first portion 86a of transparent layer 86, for reasons hereinafter described. It is contemplated for outer surface 90 of transparent layer 86 to be printable surface so as to allow a converter/merchant/seller/retailer to print desired information thereon. Adhesive 100 is provided on and is affixed to the entirety of inner surface 88 of the transparent layer 86.

In order to assemble tag 10, backing layer 106 is positioned over transparent layer 86. Backing layer 106 includes first and second spaced edges 116 and 118, respectively, and first and second spaced ends 112 and 114, respectively. A scored or perforated line 115 is transverse to and first and second edges 116 and 118, respectively, at a location generally equidistant from first and second ends 112 and 114, respectively. Perforated line 115 is generally parallel to first and second ends 112 and 114, respectively, and divides backing layer 106 into first and second portions 106a and 106b, respectively. Backing layer 106 further includes an inner surface 108 and an outer surface 110. It is contemplated for a first portion 108a of inner surface 108 of backing layer 106 associated with first portion 106a of backing layer 106 to have a surface area approximately equal to the surface area of first portion 88a of inner surface 88 of transparent layer 86 and for a second portion 108b of inner surface 108 of backing layer 106 associated with second portion 106b of backing layer 106 to have a surface area generally equal to the surface area of second portion 88b of inner surface 88 of transparent layer 86. A non-binding material such as silicone 126 is bonded to second portion 108b of inner surface 108 of backing layer 106, for reasons hereinafter described. In addition, an aperture 30b extends through first portion 106a of backing layer 106, for reasons hereinafter described. As described, backing layer 106 has a generally rectangular configuration. However, other configurations are possible without deviating from the scope of the present invention.

Figure 8:
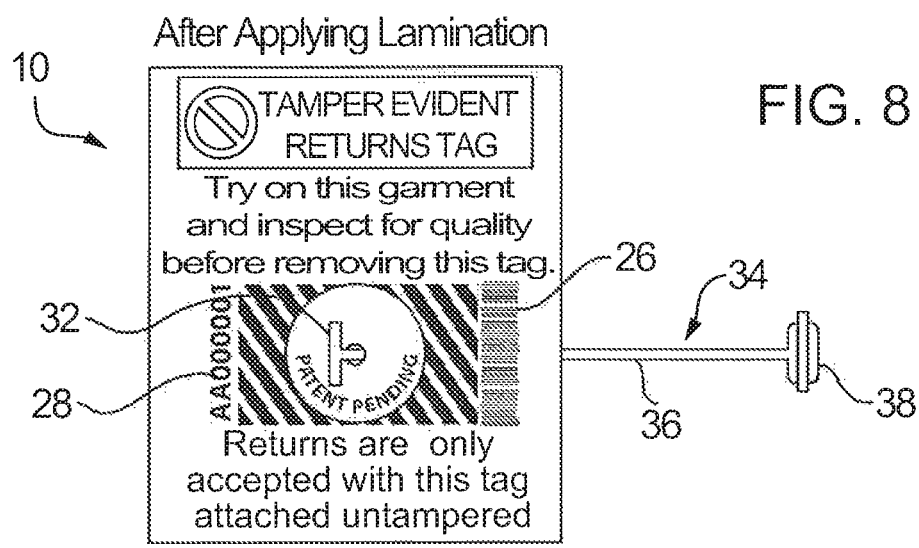
FIG. 8 is a top plan view of the tamper evident tag in accordance with the present invention in the second configuration.
Figure 9:
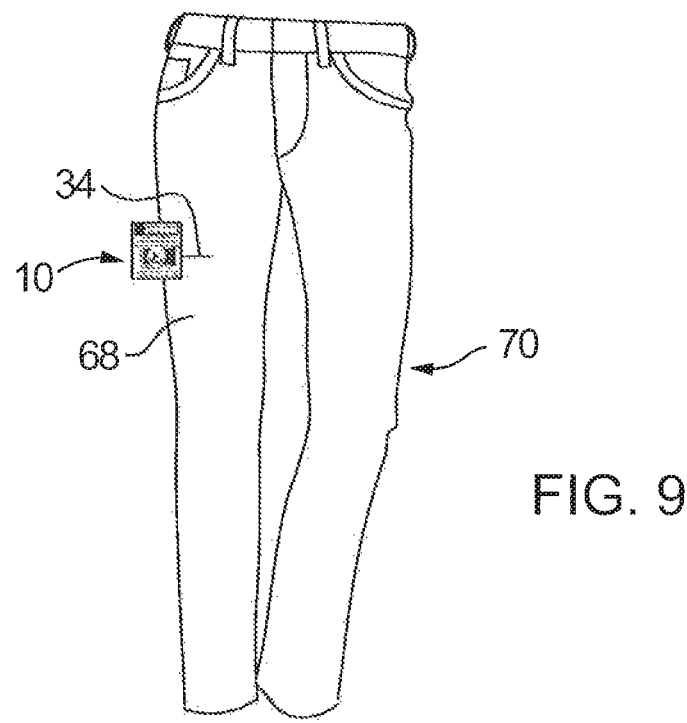
FIG. 9 is an elevational view the tamper evident tag in accordance with the present invention interconnected to an article of clothing to be sold.

It is contemplated for outer surface 110 of backing layer 106 to be a printable surface so as to allow a converter/merchant/seller/retailer to print desired information thereon, see FIGS. 8 and 9. Outer surface of backing layer 106 has first and second portions 110a and 110b, respectively. The printed matter is generally printed on first portion 110a of outer surface 110 of backing layer 106 associated with first portion 106a of backing layer 106, as second portion 106b of backing layer 106 will be eventually removed and discarded. It is contemplated to print any information on first portion 110a of outer surface 110 of backing layer 106, as required by the converter/merchant/seller/retailer at a point of sale. By way of example, a barcode generally designated by the reference number 26 may be printed on first portion 110a of outer surface 110 of backing layer 106, FIG. 9. In the depicted embodiment, barcode 26 may take the form of a conventional 12-digit universal product code. However, other types of unique identifiers may be printed, such as a matrix code or a quick response code, for reasons hereinafter described. In addition, it is further contemplated for a unique alphanumeric code 28 to be printed on first portion 110a of outer surface 110 of backing layer 106, for reasons hereinafter described.

Backing layer 106 is positioned with respect to transparent layer 86 such that: 1) first and second edges 116 and 118, respectively, of backing layer 106 are aligned with first and second edges 92 and 94, respectively of transparent layer 86; 2) first and second ends 112 and 114, respectively, of backing layer 106 are aligned with first and second ends 96 and 98, respectively, of transparent layer 86; 3) perforated line 115 of backing layer 106 is aligned with score line 99 of transparent layer 86; and 4) aperture 30b through first portion 106a of backing layer 106 is axially aligned with aperture 30a through first portion 86a of transparent layer 86. Thereafter, first portion 108a of inner surface 108 of backing layer 106 is positioned against the adhesive 100 bonded to first portion 88a of inner surface 88 of transparent layer 86 so as to bond first portion 106a of backing layer 106 to first portion 86a of transparent layer 86. It is intended for the adhesive 100 to have sufficient adhesive characteristics such that once first portion 106a of backing layer 106 is bonded to first portion 86a of transparent layer 86, first portion 106a of backing layer 106 and first portion 86a of transparent layer 86 cannot be separated without damaging tag 10. Similarly, second portion 108b of inner surface 108 of backing layer 106, having silicone 126 bonded thereto, is positioned against the adhesive 100 bonded to second portion 88b of inner surface 88 of transparent layer 86 thereby releasably affixing second portion 106b of backing layer 106 to second portion 86b of transparent layer 86. Silicone 126 or other non-binding material, e.g., wax or Teflon, prevents second portion 106b of backing layer 106 from becoming permanently bonded to the adhesive layer 100. As such, it can be appreciated that silicone 126 on second portion 108b of inner surface 108 of backing layer 106 allows for second portion 106b of backing layer 106 to be removed from second portion 86b of transparent layer 86, for reasons hereinafter described. With tag 10 assembled, as heretofore described, it can be appreciated that aperture 30b through first portion 106a of backing layer 106 and aperture 30a through first portion 86a of transparent layer 86 define passageway 30 through tag 10.

Figure 4:
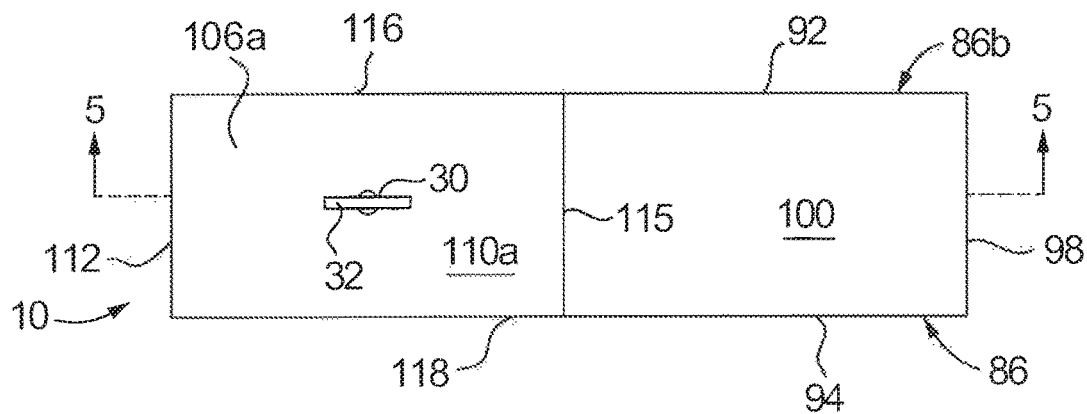
FIG. 4 is a top plan view of the tamper evident tag of FIG. 2B with a portion of a layer of the tamper evident tag removed.
Figure 2A:
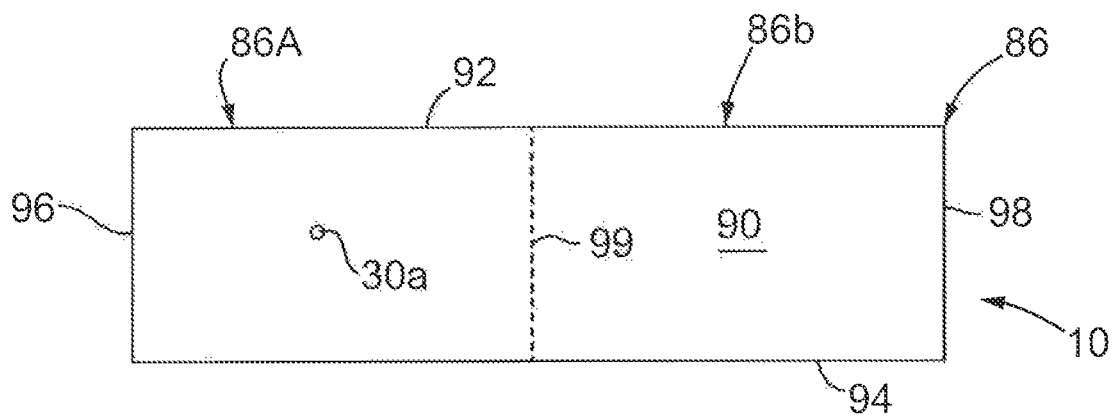
FIG. 2A is a bottom plan view of a tamper evident tag separated from the roll of FIG. 1 in an initial configuration.
Figure 2B:
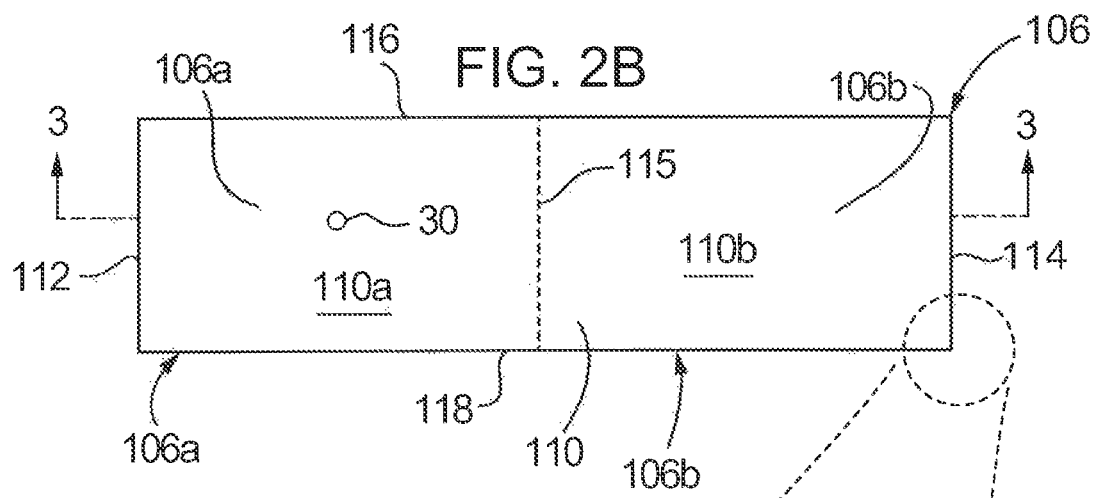
FIG. 2B is a top plan view of a tamper evident tag separated from the roll of FIG. 1 in an initial configuration.
Figure 2C:
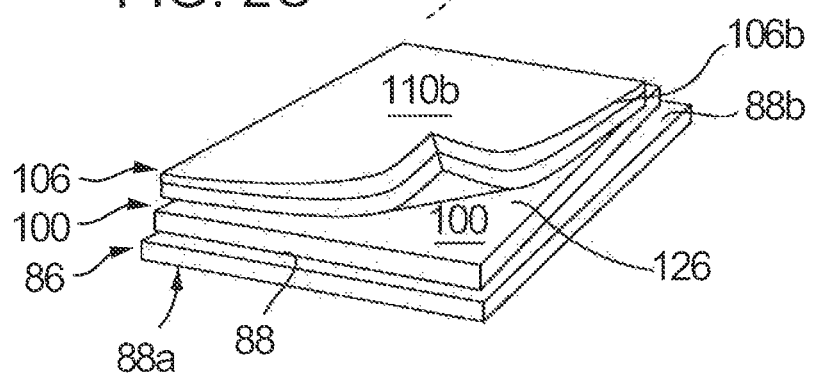
FIG. 2C is an enlarged isometric view showing the layers of the tamper evident tag of FIG. 2B.
Figure 5:
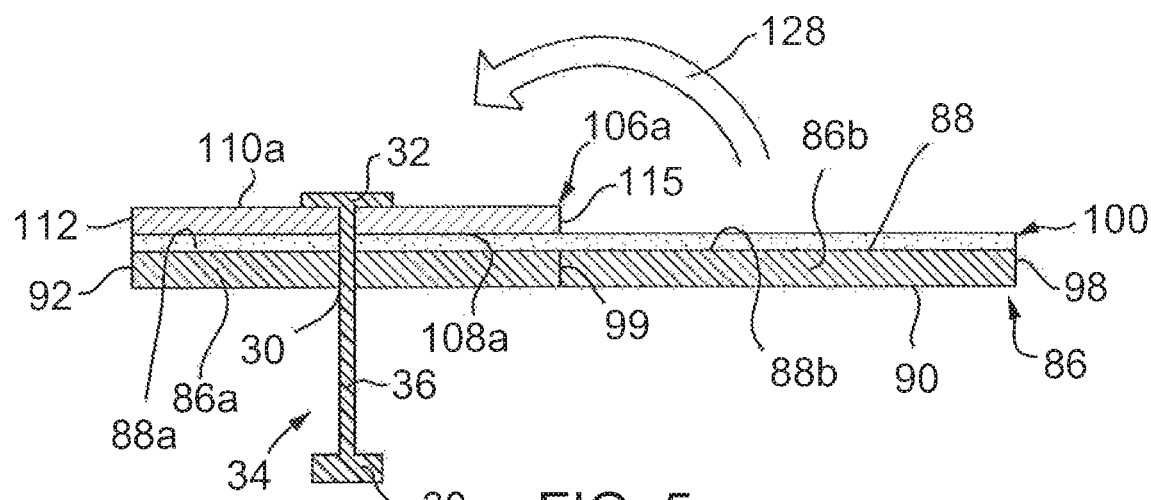
FIG. 5 is a cross-sectional view of the tamper evident tag of the present invention taken along line 5-5 of FIG. 4.

Referring to FIGS. 4 and 5, passageway 30 is adapted for receiving a portion of a tag fastener, e.g. first T-shaped end 32 of a conventional tag fastener 34. Tag fastener 34 includes a thin filament 36 which joins T-shaped end 32 and a second paddle-shaped end 38. It is contemplated to fabricate tag fastener 34 from a nylon material. However, it is contemplated to fabricate tag fastener 34 from other materials without deviating from the scope of the present invention. It can be appreciated that other types of fasteners may be used to interconnect tag 10 to the article to be sold by the converter/merchant/seller/retailer, without deviating from the scope of the present invention. It can also be appreciated that additional passageways 30 may be provided in tag 10 to allow for the converter/merchant/seller/retailer to connect additional items to tag 10 via tag fasteners, e.g. a radio frequency identification (RFID) device, to accommodate different styles of tag fasteners and/or to interconnect tag 10 to the article to be sold via multiple tag fasteners.

In operation, it is intended to interconnect tag 10 to a conspicuous area of a product or garment, such as front panel 68 of a pair of jeans 70, FIG. 9. In order to interconnect tag 10 to front panel 68 of jeans 70, a tag attaching tool may be used. By way of example, the tag attaching tool may take the form of a conventional tag attacher with a gun-shaped tool body including a handle with a spring-loaded depressable trigger. A hollow slotted needle extends from the front of tool body and a supply of conventional tag fasteners 34 is loaded into the tag attacher. The needle of the tag attacher is inserted through and penetrates the article to be tagged, namely, front panel 68 of jeans 70, and through passageway 30 extending through tag 10. When the trigger of the tag attacher is depressed, a push rod connected to the trigger by mechanical parts within the tool body causes T-shaped end 32 of tag fastener 34 to travel through the needle and be ejected out of the forward end thereof, while filament 36 passes through the slot in the needle. As a result, the T-shaped end 32 of tag fastener 34 is provided on the outer surface 110 of hacking layer 106, FIG. 5, while paddle-shaped end 36 of tag fastener 34 is situated on a second, opposite side of the front panel 68 of jeans 70, FIG. 9, with filament 36 extending therebetween so as anchor base layer 106 to front panel 68 of jeans 70.

Figure 6:
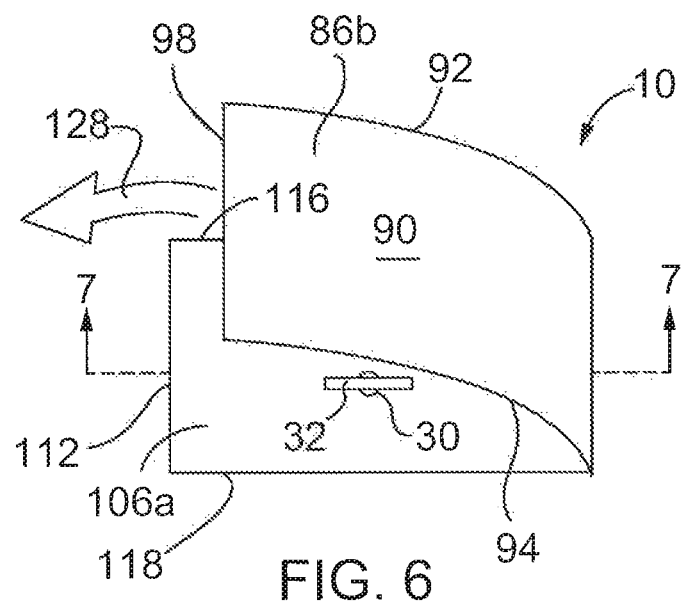
FIG. 6 is a top plan view of the tamper evident tag of FIG. 4 in a second configuration wherein the first side is being folded onto and joined to a second side.
Figure 7:
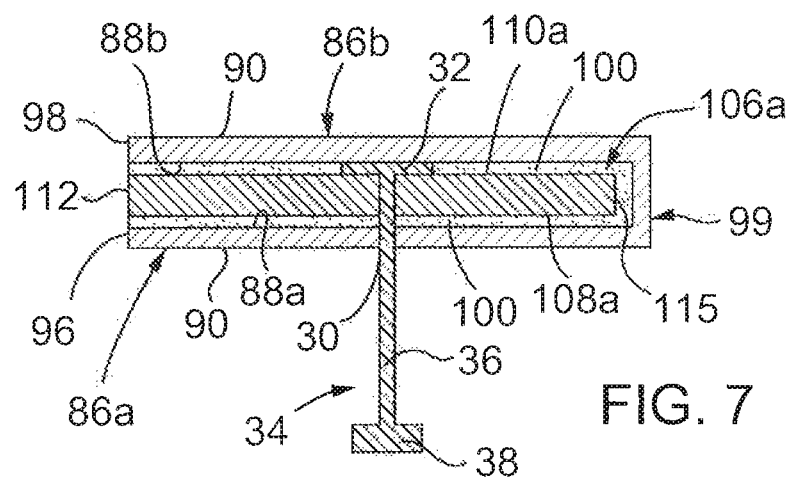
FIG. 7 is a cross-sectional view of the tamper evident tag of the present invention taken along line 7-7 of FIG. 6.

Referring to FIGS. 4 and 5, once tag 10 is anchored to the front panel 68 of jeans 70, second portion 106b of backing layer 106 is removed tag 10 so as to expose the adhesive 100 bonded to second portion 88b of inner surface 88 of transparent layer 86. Once second portion 106b of backing layer 106 is separated from tag 10, second portion 86a of transparent layer 86 is folded along score line 99 over first portion 110a of outer surface 110 of first portion 106a of backing layer 106, in the direction shown by arrow 128. Once second edge 94 of transparent layer 86 is aligned with first edge 92 of transparent layer 86, the adhesive 100 bonded to second portion 88b of inner surface 88 of transparent layer 86 is brought into contact with first portion 110a of outer surface 110 of first portion 106a of backing layer 106 such that second portion 86b of transparent layer 86 becomes bonded to first portion 106a of backing layer 106 by adhesive 100, FIG. 6. It is intended for the adhesive 100 to have sufficient adhesive characteristics such that once second portion 86b of transparent layer 86 is bonded to first portion 106a of backing layer 106, first portion 106a of backing layer 106 and first portion 86a of transparent layer 86 cannot be separated without damaging tag 10. With second portion 86b of transparent layer 86 bonded to first portion 106a of backing layer 106, T-shaped end 32 of tag fastener 34 is captured therebetween, FIGS. 7 and 8. As a result, tag 10 cannot be removed from front panel 68 of jeans 70 without damaging either tag 10, tag fastener 34 or panel 68 of jeans 70. By placing tag 10 in a conspicuous place of the article sold, e.g. front panel 68 of jeans, and by refusing the return of any articles without untampered tag 10 affixed thereto, a converter/merchant/seller/retailer of an article can discourage the practice of wardrobing by the consumer, FIG. 9. As such, it can be understood tag 10 will prevent the fraudulent returns of articles previously worn by the customers. It can be appreciated that the transparent nature of layer 86 allows for a converter/merchant or retailer to confirm that tag fastener 34 is correctly attached to tag 10 and to visually determine if tampering with tag 10 has occurred.

For added security, as described above, each tag 10 includes unique barcode 26 and/or unique alphanumeric code 28 printed on first portion 110a of outer surface 110 of first portion 106a of backing layer 106 which is visible through second portion 86b of transparent layer 86. When a customer purchases, an article such as jeans 70, the seller of the article has attached tag 10 to the article, as heretofore described. In addition, the converter/merchant/seller/retailer scans unique barcode 26 and/or unique alphanumeric code 28 printed first portion 110a of outer surface 110 of first portion 106a of backing layer 106. In response, unique barcode 26 and/or unique alphanumeric code 28 on tag 10 becomes associated with the article sold by the converter/merchant/seller/retailer in their records and such information is caused to be embedded on the customer's receipt for the article for future reference. If a customer attempts to return the article, the converter/merchant/seller/retailer once again scans unique barcode 26 and/or unique alphanumeric code 28 on tag 10 and the customer's receipt for the article to compare the information. If the unique barcode 26 and/or unique alphanumeric code 28 information gathered from tag 10 does not match the embedded information on the customer's receipt, the converter/merchant/seller/retailer may conclude that the article being returned by the customer is ineligible for a refund or an exchange. In addition, it is further contemplated to capture a security device, e.g. a radio frequency patch, between second portion 86b of transparent layer 86 and first portion 106a of backing layer 106. The security device can set off an alarm if tag 10 is removed from a desired area, e.g. the interior of a store, without authorization. Alternatively, the security device may be provided between first portion 86a of transparent layer 86 and first portion 106a of backing layer 106, if so desired. The security device can also act as a conduit for attaching a radio frequency identification (RFID) device to tamper evident tag 10 for inventory control and other non-security uses.

FIG. 10 depicts a schematic representation of a methodology for fabricating a plurality of tamper evident tags 10 in accordance with the present invention. More specifically, a first end 152 of roll 150 of backing material 154 is unrolled. It can be appreciated that roll 150 of backing material 154 is used to fabricate backing layer 106 of each tamper evident tag 10. Roll 150 of backing material 154 has first and second edges 156 and 158, respectively, and an inner surface 160. A plurality of spaced, strips 162a-162d of silicon are deposited on inner surface 160 of roll 150. Each strip 162a-162d has a width generally equal to the width of second portion 106b of backing layer 106 of tamper evident tag 10. In addition, each strip 162a-162d is defined by first and second edges 164 and 166, respectively, and is generally parallel to the others and to the first and second edges 156 and 158, respectively, roll 150 of backing material 154. First edge 164 of strip 162a is coincident with first edge 154 of roll 150. Second edges 166 of strips 162a-162c are spaced from first edges 164 of adjacent strips 162b-162d, respectively, by a width generally equal to the width of first portion 106a of backing layer 106 of tamper evident tag 10. Hence, as described, a plurality of spaced, exposed strips 170a-170d of backing material 154 are formed along inner surface 160 of roller 150 such that the plurality of spaced, exposed strips 170a-170d of backing material 154 alternate with the plurality of strips 162a-162d of silicon along inner surface 106 of roll 150. Each exposed strip 170a-170d has a width generally equal to the width of first portion 106a of backing layer 106 of tamper evident tag 10.

Once the plurality of strips 162a-162d is deposited on inner surface 160 of roll 150, as heretofore described, it is contemplated to deposit adhesive 172 on inner surface 160 of roll 150 so as to completely cover the plurality of spaced, exposed strips 170a-170d of backing material 154 and the plurality of strips 162a-1162d of silicon. Adhesive 172 forms adhesive layer 100 in tamper evident tag 10, as heretofore described. Once adhesive 172 is deposited on inner surface 160 of roll 150, web of transparent material 174 is deposited on adhesive 172. More specifically, roll 176 of transparent material 174 is unfurled and the inner surface thereof is brought into contact with adhesive 172 so as to bind transparent material 174 to adhesive 172. It is contemplated to position radio frequency identification (RFID) devices between the adhesive and transparent material 174 as locations corresponding to individual tamper evident tags 10, as hereinafter described. As previously noted, each radio frequency identification (RFID) device associated with a corresponding tamper evident tag 10 may be used for inventory, control and other non-security uses.

Once transparent material 174 is bonded to adhesive 172, it is contemplated to print any desired information on outer surface 180 of backing material 154 and on outer surface 182 of transparent material 174. As heretofore described, barcodes for each tamper evident tag 10 may be printed on outer surface 180 of backing material 154. Likewise, unique identifiers, such matrix codes, quick response codes or a unique alphanumeric codes, for each tamper evident tag 10 may be printed on outer surface 182 of transparent material 174. Thereafter, perforations may be die cut into roll 150 of backing material 154, with the plurality of strips 162a-162d of silicon, adhesive 172 and the transparent material 174 bonded thereto, so to form a plurality of individual tamper evident tags 10, as heretofore described. Each tamper evident tag 10 may be separated from the plurality of tamper evident tags 10 as needed.

Referring FIGS. 11-15, an alternate embodiment of a tamper evident tag for preventing the fraudulent return of retail goods and/or refunds therefore is generally designated by the reference numeral 210. Tag 210 includes a base layer 212 having first and second sides 214 and 216, respectively. Base layer 212 is further defined by first and second edges 218 and 220, respectively, and first and second ends 222, and 224, respectively. In the depicted embodiment, base layer 212 has a generally rectangular configuration. However, other configurations are possible without deviating from the scope of the present invention. It is further contemplated to fabricate base layer 212 from a single layer of material or from a plurality of layers sandwiched together. For example, base layer 212 may be comprised of web of white gloss tag material laminated to a web of fabric material. In addition, it is contemplated to capture a security device, e.g. a radio frequency patch, between two outer webs of web material used to form base layer 212. The security device can set off an alarm if tag 210 is removed from a desired area, e.g. the interior of a store, without authorization. Alternatively, the security device may be affixed to one of first and second sides 214 and 216, respectively, of base layer 212, if so desired.

Figure 17:
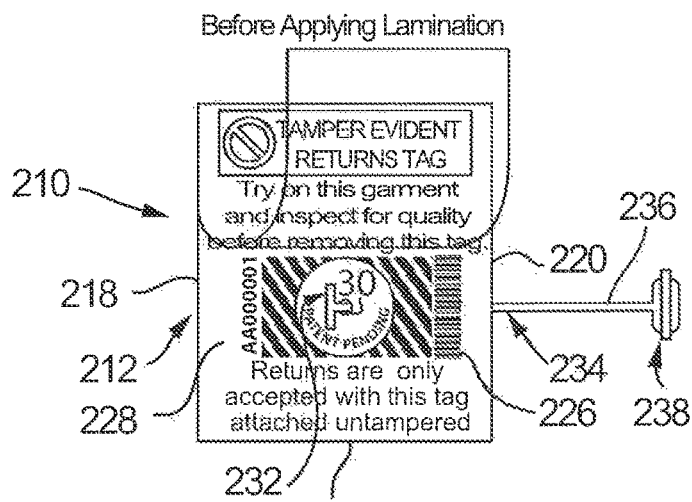
FIG. 17 is a top plan view of a tamper evident tag of FIG. 11 in an initial configuration.
Figure 18:
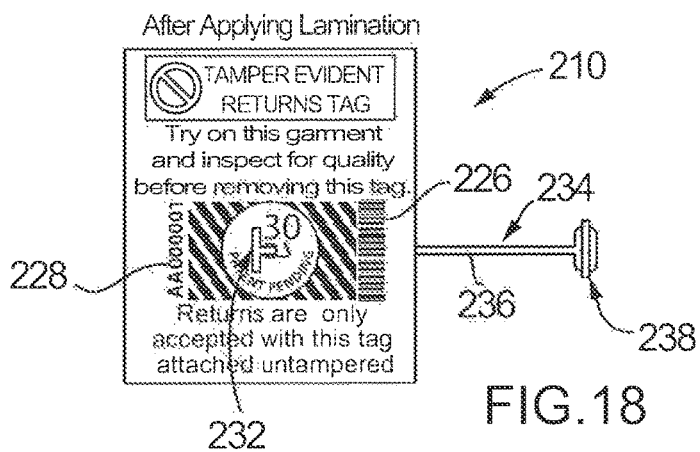
FIG. 18 is a top plan view of a tamper evident tag of FIG. 11 in an affixed configuration.

First and second sides 214 and 216, respectively, of base layer 212 are intended to be printable surfaces so as to allow a converter/merchant/seller/retailer to print desired information thereon, FIGS. 17-18. In other words, it is contemplated to print any information on first and second sides 214 and 216, respectively, of base layer 212 required by the converter/merchant/seller/retailer at a point of sale. By way of example, a barcode generally designated by the reference number 226 may be printed on first side 214 of base layer 212. In the depicted embodiment, barcode 226 may take the form a conventional 12-digit universal product code. However, other types of unique identifiers may be printed on first side 214 such as a matrix code or a quick response code, for reasons hereinafter described. In addition, it is further contemplated for a unique alphanumeric code 228 to be printed on first side 214 of base layer 212, for reasons hereinafter described.

Base layer 212 further may include at least one aperture 230 extending between first and second sides 214 and 216, respectively, of base layer 212 to facilitate the connection of base layer 212 to an article to be sold by the converter/merchant/seller/retailer. In the depicted embodiment, aperture 230 is adapted for receiving a portion of a tag fastener, e.g. first T-shaped end 232 of a conventional tag fastener 234. Tag fastener 234 includes a thin filament 236 which joins T-shaped end 232 and a second paddle-shaped end 238. It is contemplated to fabricate tag fastener 234 from a nylon material. However, it is contemplated to fabricate tag fastener 234 from other materials without deviating from the scope of the present invention. It can be appreciated that other types of fasteners may be used to interconnect base layer 212 to the article to be sold by the converter/merchant/seller/retailer, without deviating from the scope of the present invention. It can also be appreciated that additional apertures 230 may be provided in base layer 212 to allow for the converter/merchant/seller/retailer to connect additional items to base layer 212 via tag fasteners (e.g. a radio frequency identification (RFID) device), to accommodate different styles of tag fasteners and/or to interconnect base layer 212 to the article to be sold via multiple tag fasteners.

Figure 16:
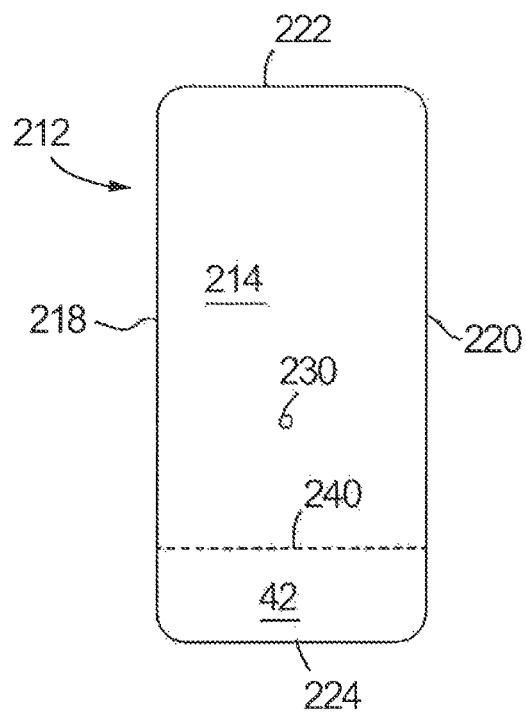
FIG. 16 is a top plan view of an alternate embodiment of a base layer of the tamper evident tag of FIG. 11.

Referring to FIG. 16, it is contemplated for base layer 212 to including a plurality of perforations 40 extending between first and second sides 214 and 216, respectively, thereof. Perforations 40 define a removable portion 242 of base layer 212 on a first side thereof. By way of example, removable portion 242 of base layer 212 may include pricing and product information printed thereon. A user may remove the pricing and product information from base layer 212 by simply tearing removable portion 242 from base layer 212 along the plurality of perforations 240.

Referring back to FIGS. 11-12 and 14-15, tag 210 further includes transparent layer 244 having first and second sides 246 and 248, respectively. Transparent layer 244 is further defined by first and second edges 250 and 252, respectively, and first and second ends 254 and 256, respectively. In the depicted embodiment, transparent layer 244 has a generally rectangular configuration corresponding in size and shape to the configuration of base layer 212. However, other configurations of transparent layer 244 are possible without deviating from the scope of the present invention.

It is intended for first and second sides 246 and 248, respectively, of transparent layer 244 to be aligned with corresponding first and second sides 214 and 216, respectively, of base layer 212 and for first and second edges 250 and 252, respectively, of transparent layer 244 to be aligned with corresponding first and second edges 218 and 220, respectively, of base layer 212. Second side 248 of transparent layer 244 includes a first portion 258 adjacent to first end 254 thereof which is bound to a first portion 260 of first side 214 of base layer 212 in any conventional manner, such as by an adhesive or the like. Second side 248 of transparent layer 244 also includes a second portion 262 adjacent second end 256 thereof. Second portion 262 of second side 248 of transparent layer 244 includes an adhesive thereon. It is intended for the adhesive on second portion 262 of second side 248 of transparent layer 244 to have sufficient adhesive characteristics such that once bonded to first side 214 of base layer 212, in a manner hereinafter described, second portion 262 of second side 248 of transparent layer 444 cannot be removed from first side 214 of base layer 212 without damaging first side 214 of base layer 212. A removable, non-binding layer 266 is releasably affixed to second portion 262 of second side 248 of transparent layer 244.

Figure 19:
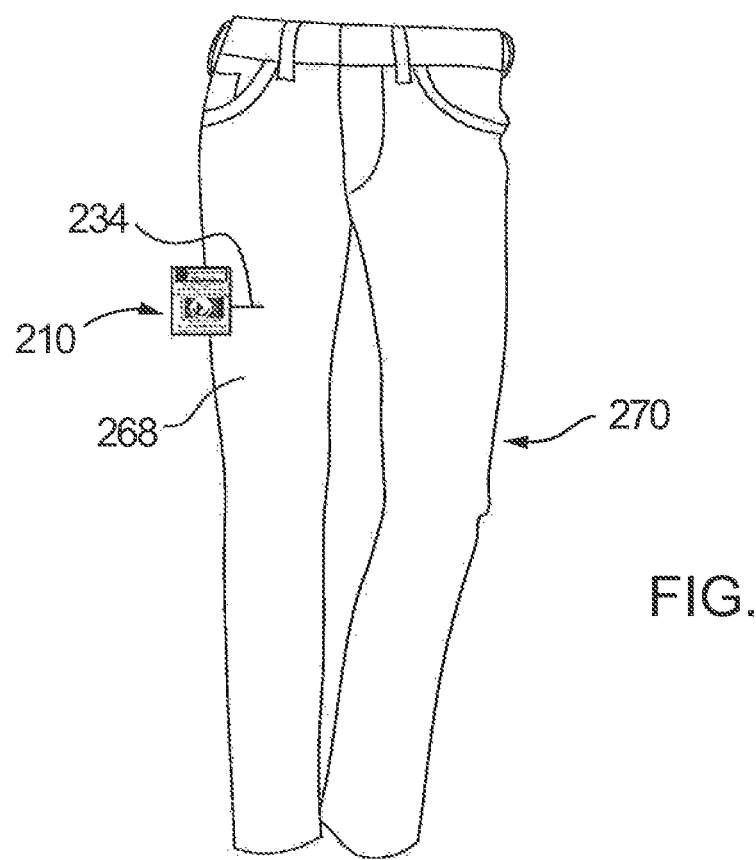
FIG. 19 is an elevational view a tamper evident tag of FIG. 11 interconnected to an article to be sold.

In operation, it is intended interconnect tag 210 to a conspicuous area of a product or garment, such as front panel 268 of a pair of jeans 270, FIG. 19. In order to interconnect tag 210 to front panel 268 of jeans 270, a tag attaching tool may be used. By way of example, the tag attaching tool make take the form of a conventional tag attacher with a gun-shaped tool body including a handle with a spring-loaded depressable trigger. A hollow slotted needle extends from the front of tool body and a supply of conventional tag fasteners 234 is loaded into the tag attacher. The needle of the tag attacher is inserted through and penetrates the article to be tagged, namely, front panel 268 of jeans 270, and through aperture 230 extending between first and second sides 214 and 216, respectively, of base layer 212 positioned on a first side of front panel 268 of jeans 270. When the trigger of the tag attacher is depressed, a push rod connected to the trigger by mechanical parts within the tool body causes T-shaped end 232 of tag fastener 234 to travel through the needle and be ejected out of the forward end thereof, while filament 236 passes through the slot in the needle, FIG. 17. As a result, the T-shaped end 232 of tag fastener 234 is provided on first side 214 of base layer 212 of tag 210, while paddle-shaped end 236 of tag fastener 234 is situated on a second, opposite side of the front panel 268 of jeans 270, with filament 236 extending therebetween so as anchor base layer 212 to front panel 268 of jeans 270.

Once base layer 212 is anchored to front panel 268 of jeans 270, removable, non-binding layer 266 is removed from second portion 262 of second side 248 of transparent layer 244 so as to expose the adhesive provided thereon. Thereafter, second portion 262 of second side 248 of transparent layer 244 is brought into contact with first side 214 of base layer 212 such that second portion 262 of second side 248 of transparent layer 244 is bonded to first side 214 of base layer 212 by the adhesive thereon, FIG. 18. With second portion 262 of second side 248 of transparent layer 244 bonded to first side 214 of base layer 212, T-shaped end 232 of tag fastener 234 is captured between second portion 262 of second side 248 of transparent layer 244 and first side 214 of base layer 212. As a result, tag 210 cannot be removed from front panel 268 of jeans 270 without damaging either tag 210, tag fastener 234 or panel 268 of jeans 270. By placing tag 210 in a conspicuous place of the article sold, e.g. front panel 268 of jeans 270, and by refusing the return of any articles without untampered tag 210 affixed thereto, a converter/merchant/seller/retailer of an article can discourage the practice of wardrobing by the consumer. As such, it can be understood tag 210 will prevent the fraudulent returns of articles previously worn by the customers. It can be appreciated that the transparent nature of layer 244 allows for a merchant or retailer to confirm that tag fastener 234 is correctly attached to tag 210 and to visually determine if tampering with tag 210 has occurred.

For added security, as described above, each tag 210 includes unique barcode 226 and/or unique alphanumeric code 228 printed on first side 214 of base layer 212. When a customer purchases, an article such as jeans 270, the seller of the article has attached tag 210 to the article, as heretofore described. In addition, the converter/merchant/seller/retailer scans unique barcode 226 and/or unique alphanumeric code 228 printed on first side 214 of base layer 212. In response, unique barcode 226 and/or unique alphanumeric code 228 on tag 210 becomes associated with the article sold by the converter/merchant/seller/retailer their records and such information is caused to be embedded on the customer's receipt for the article for future reference. If a customer attempts to return the article, the converter/merchant/seller/retailer once again scans unique barcode 226 and/or unique alphanumeric code 228 on tag 210 and the customer's receipt for the article to compare the information. If the unique barcode 226 and/or unique alphanumeric code 228 information gathered from tag 210 does not match the embedded information on the customer's receipt, the converter/merchant/seller/retailer may conclude that the article being returned by the customer is ineligible for a refund or an exchange. Alternatively, given that the unique barcode 226 and/or unique alphanumeric code 228 on tag 210 becomes associated with the article sold by the converter/merchant/seller/retailer in their records, tag 210 can act as a customer's receipt for the article.

It can be appreciated that the above description of a tamper evident tag is merely exemplary of the present invention. Various modes of carrying out the invention are contemplated as being within the scope of the following claims particularly pointing out and distinctly claiming the subject matter, which is regarded as the invention.

I claim:

1. A method of associating a tamper evident tag with an article, the method comprising the steps of:
providing the tamper evident tag with first and second layers laminated to each other;
inserting a terminal first end of a fastener through the article at a user selected location thereof such that the first end of the fastener, which is spaced from the tamper evident tag, retains the article on the fastener;
positioning a terminal second end of the fastener on a second layer of the tamper evident tag;
removing a first portion of the second layer to expose an adhesive on a first portion of the first layer; and
folding the first portion of the first layer of the tamper evident tag over a second portion of the first layer so as to capture a second portion of the inner layer between the first and second portions of the first layer and to capture the terminal second end of the fastener between the first portion of the first layer and the second portion of the second layer of the tamper evident tag thereby interconnecting the fastener to tamper evident tag.

2. The method of claim 1 wherein the second layer is adapted for receiving printing thereon and further comprising the additional step of printing security information on a first side of the second layer of the tamper evident tag.

3. The method of claim 1 wherein:
the second portion of the first layer includes an adhesive thereon; and
the second portion of the second layer being bound to the second portion of the first layer by the adhesive.

4. The method of claim 3 wherein the first portion of the second layer has a non-binding layer of material affixed thereto.

5. The method of claim 4 wherein the material is one of silicone and wax.

6. The method of claim 1 wherein the second layer has a printable surface.

7. The method of claim 1 comprising the additional step of printing at least one of a barcode and an alphanumeric code on the second layer.

8. The method of claim 1 wherein the first layer is transparent.

9. A method of securely identifying an article, comprising the steps of:
providing a unique code on the tag;
inserting a fastener through the article at a user selected location such that a first end of the fastener, which is spaced from the tag, retains the article on the fastener;
positioning a terminal second end of a fastener adjacent an inner layer of the tag;
removing a portion of the inner layer of the tag to expose an adhesive on the outer layer of the tag;
contacting the exposed adhesive with the inner layer of the tag to capture the terminal second end of the fastener between the outer layer and the inner layer and retain the tag on the fastener; and
associating the unique code with the article for future reference.

10. The method of claim 9 comprising the additional steps of: embedding information on the unique code in a receipt provided to a customer; and comparing the information on the unique code embedded in a receipt with the unique code on the tag and preventing exchange of the article if the information on the unique code embedded in a receipt fails to match the unique code of the tag.

11. The method of claim 9 wherein the outer layer is transparent.

12. The method of claim 9 wherein the first portion of the inner layer is coated with a releasable, non-binding agent.

13. The method of claim 12 wherein the non-binding agent is silicone.

14. The method of claim 12 wherein a second portion of the inner layer is free of the releasable, non-binding agent.

15. The method of claim 9 wherein the unique code includes at least one of a barcode and an alphanumeric code.

16. A method of properly identifying an article, the method comprising the steps of:
providing an identification tag with inner and outer layers laminated to each other, each of the inner and outer layers including first and second portions;

extending a first end of a fastener though the article such that the first end of the fastener, which is spaced from the identification tag, retains the article on the fastener;

printing a unique identification code on the inner layer of the identification tag;

positioning a terminal second end of the fastener adjacent to the second portion of the inner layer of the identification tag;

removing the first portion of the inner layer of the identification tag to expose an adhesive on the first portion of the outer layer; and folding the first portion of the outer layer over the second portion of the inner layer so as to capture the second portion of the inner layer and the second end of the fastener between the first and second portions of the outer layer so as to interconnect the fastener to the identification tag.

17. The method of claim 16 wherein at least one of the first and second portions of the outer layer is transparent such that the printing on the inner layer is visible through the outer layer of the identification tag.

18. The method of claim 16 wherein the second portion of the inner layer is bound to the second portion of the outer layer by the adhesive.

19. A method of properly identifying an article, the method comprising the steps of:

providing an identification tag with inner and outer layers laminated to each other, each of the inner and outer layers including first and second portions;

extending a fastener though the article, the fastener having a terminal end;

printing a unique identification code on the inner layer of the identification tag;

positioning the terminal end of the fastener adjacent to the second portion of the inner layer of the identification tag;

removing the first portion of the inner layer of the identification tag to expose an adhesive on the first portion of the outer layer; and folding the first portion of the outer layer over the second portion of the inner layer so as to capture the second portion of the inner layer and the terminal end of the fastener between the first and second portions of the outer layer;

wherein the first portion of the inner layer has a non-binding layer of material affixed thereto.

20. The method of claim 19 wherein the material is one of silicone and wax.

21. A method of properly identifying an article, the method comprising the steps of:

providing an identification tag with inner and outer layers laminated to each other, each of the inner and outer layers including first and second portions;

extending a fastener though the article, the fastener having a terminal end;

printing a unique identification code on the inner layer of the identification tag;

positioning the terminal end of the fastener adjacent to the second portion of the inner layer of the identification tag;

removing the first portion of the inner layer of the identification tag to expose an adhesive on the first portion of the outer layer; and folding the first portion of the outer layer over the second portion of the inner layer so as to capture the second portion of the inner layer and the terminal end of the fastener between the first and second portions of the outer layer;

wherein the unique identification code is at least one of a barcode and an alphanumeric code.

22. A method of properly identifying an article, the method comprising the steps of:

providing an identification tag with inner and outer layers laminated to each other, each of the inner and outer layers including first and second portions;

extending a fastener though the article, the fastener having a terminal end;

printing a unique identification code on the inner layer of the identification tag;

positioning the terminal end of the fastener adjacent to the second portion of the inner layer of the identification tag;

removing the first portion of the inner layer of the identification tag to expose an adhesive on the first portion of the outer layer; and folding the first portion of the outer layer over the second portion of the inner layer so as to capture the second portion of the inner layer and the terminal end of the fastener between the first and second portions of the outer layer;

wherein the first and second portions of the outer layer are transparent.

* * * * *